(12) United States Patent
Goldstein et al.

(10) Patent No.: US 8,726,076 B2
(45) Date of Patent: May 13, 2014

(54) OPERATOR STATE CHECKPOINT MARKERS AND REHYDRATION

(75) Inventors: Jonathan D. Goldstein, Woodinville, WA (US); Peter A. Zabback, Kirkland, WA (US); Badrish Chandramouli, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 328 days.

(21) Appl. No.: 13/117,165

(22) Filed: May 27, 2011

(65) Prior Publication Data

US 2012/0304003 A1 Nov. 29, 2012

(51) Int. Cl.
*G06F 11/00* (2006.01)
*G06F 11/16* (2006.01)

(52) U.S. Cl.
USPC .................. 714/15; 714/19; 714/20; 707/639

(58) Field of Classification Search
USPC .................................. 714/15, 19, 20; 707/639
See application file for complete search history.

(56) References Cited

U.S. PATENT DOCUMENTS

| | | | |
|---|---|---|---|
| 6,834,358 B2 | 12/2004 | Korenevsky et al. | |
| 7,234,075 B2 | 6/2007 | Sankaran et al. | |
| 7,409,587 B2 | 8/2008 | Perry | |
| 7,536,396 B2 | 5/2009 | Johnson et al. | |
| 7,689,863 B1 | 3/2010 | Korenevsky et al. | |
| 7,778,985 B2 | 8/2010 | Scholtz | |
| 7,890,461 B2 * | 2/2011 | Oeda et al. | 707/614 |
| 8,316,203 B2 * | 11/2012 | Eguchi et al. | 711/170 |
| 2006/0294435 A1 * | 12/2006 | Vick et al. | 714/38 |
| 2008/0294823 A1 * | 11/2008 | Viswanathan | 710/112 |
| 2009/0094445 A1 | 4/2009 | Brandyberry et al. | |
| 2009/0100029 A1 | 4/2009 | Jain et al. | |
| 2009/0106189 A1 | 4/2009 | Jain et al. | |
| 2009/0106214 A1 | 4/2009 | Jain et al. | |
| 2009/0287874 A1 | 11/2009 | Rogers et al. | |
| 2010/0293532 A1 | 11/2010 | Andrade et al. | |
| 2012/0117421 A1 * | 5/2012 | Craft et al. | 714/15 |

OTHER PUBLICATIONS

Hou, et al., "HydraVM: Low-Cost, Transparent High Availability for Virtual Machines", Retrieved at <<http://www.hpl.hp.com/techreports/2011/HPL-2011-24.pdf>>, Feb. 21, 2011, pp. 13.

(Continued)

*Primary Examiner* — Joseph Schell
(74) *Attorney, Agent, or Firm* — Nicholas Chen; Kate Drakos; Micky Minhas (57) ABSTRACT

A checkpoint marker can be received at a first operator. The first operator can process the checkpoint marker by sending the checkpoint marker to a second operator and sending state checkpoint information representing a state of the first operator to a checkpoint writer. The checkpoint information can be used to rehydrate the state of one or more operators. For example, after a system failure, system shutdown, etc., checkpoint information can be received from a reader unit at a checkpoint information input queue of the first operator. A state of the first operator can be rehydrated using the checkpoint information. Processing of information in a data input queue of the first operator can be suspended while the checkpoint information is used to rehydrate the state of the first operator. Other operators in a system with the first operator (e.g., the second operator) may be checkpointed and rehydrated in the same manner as the first operator.

28 Claims, 5 Drawing Sheets

(56) References Cited

OTHER PUBLICATIONS

Zhou, et al., "Fast Cluster Failover Using Virtual Memory-Mapped Communication", Retrieved at <<http://www.google.co.in/url?sa=t& source=web&cd=1&ved=0CBoQFjAA&url=http%3A%2F%2Fciteseerx.ist.psu.edu%2Fviewdoc%2Fdownload%3Fdoi%3D10.1.1.66.5150%26rep%3Drep1%26type%3Dpdf&ei=gquRTc-yBcq3hQfD7diODw&usg=AFQjCNEIX8wEXcCaWAw4Y5Ylo2AXeGj_Q&sig2=PonfPILML1kZmj>>, Proceedings of the 13th international conference on Supercomputing, 1999, pp. 10.

Liang, et al., "NT-SwiFT: Software Implemented Fault Tolerance on Windows NT", Retrieved at <<http://www.tsai-family.com/tim_work/pubs/JSS04.pdf>>, The Journal of Systems and Software, vol. 71, Issue 1-2, Apr. 2004, pp. 127-141.

"International Search Report", Mailed Date: Nov. 28, 2012, Application No. PCT/US2012/038662, Filed Date: May 18, 2012, pp. 9.

Office Action, U.S. Appl. No. 12/977,107, filed Dec. 23, 2010, Notification Date: Aug. 16, 2012, pp. 12.

Chandramouli et al., "Asynchronous Transfer of State Information Between Continuous Query Plans", U.S. Appl. No. 12/977,107, filed Dec. 23, 2010, pp. 40.

Heinz, et al., "Toward Siumulation-Based Optimization in Data Stream Management Systems", Retrieved at <<http://ieeexplore.ieee.org/stamp/stamp.jsp?tp=&arnumber=4497626>>, Apr. 2008, pp. 1-4.

Yang, et al., "HybMig: A Hybrid Approach to Dynamic Plan Migration for Continuous Queries", Retrieved at<< http://www.cs.ust.hk/-dimitris!PAPERS!TKDE07-HybMig.pdf >>, Mar. 2007, pp. 1-14.

Raizman, et al., "An Extensible Test Framework for the Microsoft StreamInsight Query Processor", Retrieved at <<http://research.microsoft.com/pubs/132100/Testing%20StreamInsight.pdf>>, Jun. 7, 2010, pp. 1-6.

Rundensteiner, et al., "CAPE: Continuous Query Engine with Heterogeneous-Grained Adaptivity", Retrieved at <<http://citeseerx.ist.psu.edu/viewdoc/download?doi=1 0.1.1.2.2561 &rep=rep1 & type=pdf>>, 2004, pp. 1-4.

Ng, et al., "On Reconfiguring Query Execution Plans in Distributed Object-Relational DBMS", Retrieved at <<http://ieeexplore.ieee.org!stamp!stamp.jsp?tp=&arnumber=741020>>, Aug. 6, 2002, pp. 1-8.

Zhu, et al., "Dynamic Plan Migration for Continuous Queries Over Data Streams", Retrieved at <<http://citeseerx.ist.psu.edu!viewdoc!download?doi=1 0.1.1.1 06.5193&rep=rep1 &type=pdf>>, 2004, pp. 1-12.

Kramer, et al. "Dynamic Plan Migration for Snapshot-Equivalent Continuous Queries in Data Stream Systems", Retrieved at <<http://dbs.mathematik.uni-marburg.de/publications/myPapers!2006!KYC+06.pdf>>, EDBT Workshop, 2007, pp. 1-20.

Chandramouli, et al., "High-Performance Dynamic Pattern Matching over Disordered Streams", Retrieved at <<http://research.microsoft.com/pubs/137082/AFA-paper.pdf>>, VLDB 2010, pp. 1-12.

Babu, et al., "Adaptive Caching for Continuous Queries", Retrieved at http:// ilpubs.stanford.edu:8090!636!1! 2004-14.pdf>>, ICDE 2005, pp. 1-22.

Madden, et al., "Continuously adaptive continuous queries over streams", Retrieved at <<http://db.cs.berkeley.edu/papers/sigmod02-cacq.pdf>>, SIGMOD 2006, pp. 1-12.

Babu, et al., "Proactive Re-Optimization", Retrieved at <<http://ilpubs.stanford.edu:8090/709/1/2005-6.pdf>>, In: Proc. of the ACM SIGMOD, 2005, pp. 107-118.

S. D. Viglas, J. F. Naughton and J. Burger. "Maximizing the output rate of multi-way join queries over streaming information sources", Retrieved at <<http://www.vldb.org/conf/2003/papers/S10P01.pdf>>, VLDB 2003, pp. 285-296.

* cited by examiner

OPERATOR STATE CHECKPOINT MARKERS AND REHYDRATION

BACKGROUND

Many data flow systems have individual processing units (operators) that keep their state in volatile memory, which can lose information upon failure or planned shut-down. The operators may be any of various different kinds of operators that can pass data items between each other within a system (e.g., programs, program components, virtual machines, physical machines, etc.). Data items are units of data that are to be processed by operators, but the data items may be in any of various different forms. For example, the data items discussed herein may be events. One or more input modules or components may provide input to the data flow system, and one or more output modules or components (sinks) may receive output from the data flow system. Some data flow systems process continuous queries. With such queries, the state may represent results of data items that have been processed over a long period of time.

SUMMARY

Loss of operator state in some data flow systems can have severe consequences, especially if the state represents information collected and processed over a prolonged period of time. The tools and techniques described below relate to saving checkpoint information and using such checkpoint information to rehydrate operator state. As used herein, checkpoint information for an operator represents a state of the operator at some time. However, the checkpoint information may represent the state in any of various different ways. For example, the checkpoint information may include representations of data structures from the operator and/or data items that were to be processed and/or already processed by the operator. These representations could be made in various ways, such as copies of the data items and/or data structures, references to stored versions of the data items and/or data structures, differences (deltas) between current data items and/or data structures and past data items and/or data structures, etc. The checkpoint information may be saved to persistent (non-volatile) storage or saved in some other manner to keep the checkpoint information safe. For example, the checkpoint information may be saved to volatile memory on a separate system from the one from which the checkpoint information was obtained.

In one embodiment, the tools and techniques can include receiving a checkpoint marker at a first operator. A checkpoint marker is a unit of data that requests that operators send state checkpoint information to a checkpoint writer. The checkpoint marker may be in any of various different forms. The first operator can process the checkpoint marker by sending the checkpoint marker to a second operator and sending state checkpoint information representing a state of the first operator to a checkpoint writer.

In another embodiment of the tools and techniques, checkpoint information can be received from a reader unit at a checkpoint information input queue of an operator. A state of the operator can be rehydrated using the checkpoint information. Processing of information in a data input queue of the operator can be suspended while the checkpoint information is used to rehydrate the state of the operator, which may bring the operator state back to a state of the operator when the checkpoint information was obtained from the operator.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for improved maintenance and restoration of operator state. Such improvements may result from the use of various techniques and tools separately or in combination.

Such techniques and tools may include a protocol in a data flow system to request that individual operators checkpoint their current main (volatile) memory state. This protocol can be designed such that operators can checkpoint their state concurrently with each other. The tools and techniques can also include a protocol to rehydrate operator state from the last complete checkpoint after a system failure. This can bring the state of the operators back to their state when their state was checkpointed.

Accordingly, the tools and techniques discussed herein may limit loss of state information upon system failure or purposeful system shutdown. This may be done with techniques to reduce impact on regular processing of the system. For example, performing checkpointing operations in different operators in parallel with each other may reduce the time to complete a checkpoint for the overall data flow system and reduce the impact of checkpointing on regular processing. The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware implementations, such as application specific integrated circuits, programmable logic arrays and other hardware devices, can be constructed to implement at least a portion of one or more of the techniques described herein. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

Figure 1:
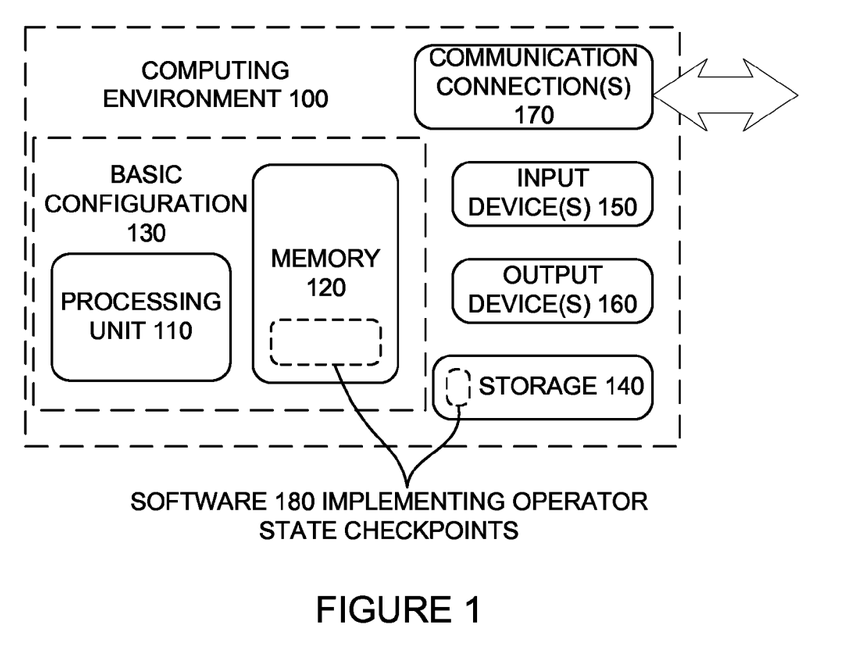
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as an operator, a checkpoint store, or an overall data flow system including multiple operators. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and at least one memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The at least one memory (120) may be volatile memory (e.g., registers, cache, RAM), non-volatile memory (e.g., ROM, EEPROM, flash memory), or some combination of the two. The at least one memory (120) stores software (180) implementing operator state checkpoints.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Operator State Checkpoint System and Environment

Figure 2:
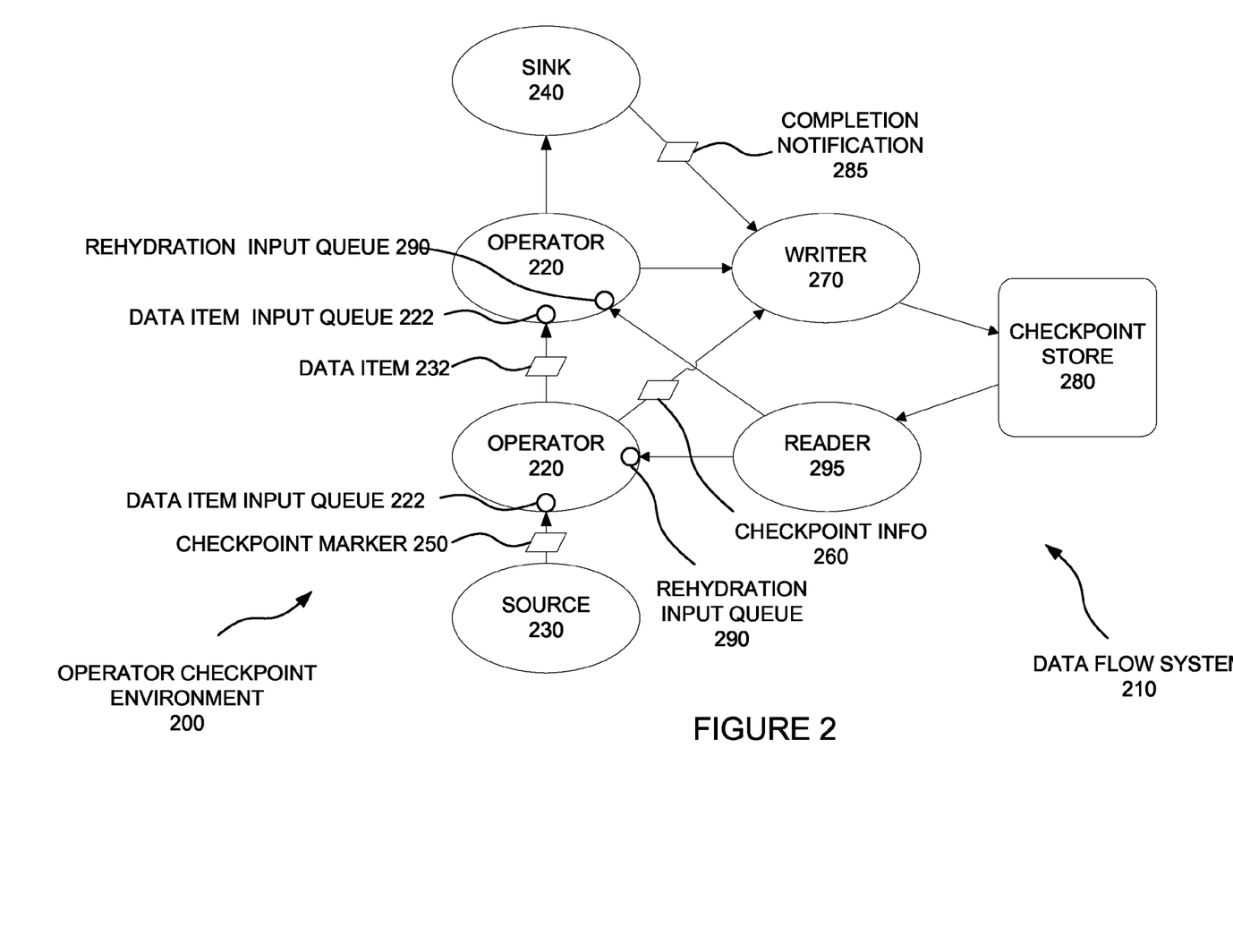
FIG. 2 is a schematic diagram of an operator state checkpoint environment.

The following discussion refers to FIG. 2, which is a schematic diagram of an operator state checkpoint environment (200) in conjunction with which one or more of the described embodiments may be implemented.

A. Data Flow System

The operator checkpoint environment (200) may include a data flow system (210) that includes operators (220). Data can flow from a source (230) and into the data flow system (210). The data flow system (210) can include multiple operators (220). To facilitate flow of data through the data flow system (210), each operator (220) may include at least one data input queue (222) and may also include at least one data output queue (not illustrated). These queues may be implemented in any of various ways, such as a single queue between operators that serves as an input queue for one operator and an output queue for another operator. The operators (220) can each perform one or more operations on data items (232) received at its input queue(s) (222) and can output data items to one or more other operators (220) and/or to a sink (240). Output from the overall data flow system (210) can be sent from a final operator (220) (or possibly from multiple final operators in more complex configurations) to the sink (240).

The data flow system (210) can be more complicated than what is illustrated in FIG. 2. For example, an operator (220) can include multiple input queues (222) receiving input from multiple operators (220) and/or multiple output queues providing output to multiple operators (220). Additionally, the data flow system (210) may receive input from multiple sources (230) and/or provide output to multiple sinks (240).

B. Checkpoint Generation

Upon receiving some data through its data input queue (222), each operator (220) can update its internal state and may generate output that can be used as input for the next operator (220) downstream. A checkpoint marker (250) may be enqueued at the source (230) of the data flow for the data flow system (210) so that the checkpoint marker can flow through the operators (220) in a manner similar to flow of data items (232) through the data flow system (210). For example, a checkpoint marker (250) may be enqueued in response to user input, or automatically in response to occurrence of some event (e.g., periodically).

When an operator (220) receives the checkpoint marker (250), the operator (220) can enqueue the checkpoint marker (250) to its output queue and then enqueue checkpoint information (260) representing the operator's own state to a separate queue. The consumer of these separate queues for the operators (220) can be a checkpoint writer (270). The checkpoint writer (270) can be an operator in the data flow system (210). When the checkpoint writer (270) receives checkpoint information (260) on one of its input queues, the checkpoint writer can write this data to a checkpoint store (280). For example, the checkpoint store (280) may include a log file for checkpoints of the data flow system (210), and may write data to the log according to a first-in-first-out technique or some other technique.

Due to the architecture of the data flow system (210), different operators (220) can process a checkpoint marker (250) in parallel. For example, a first operator (220) can receive the checkpoint marker (250), output the checkpoint marker (250) to a second operator, and then proceed to compile its checkpoint information (260) and send the checkpoint information to the writer (270). The checkpoint writer (270) can store the checkpoint information (260) in a checkpoint store. While the first operator (220) is still compiling its checkpoint information (260), the second operator (220) may have already started compiling its own checkpoint information (260). Additionally, when one operator (220) is finished processing the checkpoint marker (250), it can resume processing of data items (232), without synchronizing with other operators (220) or the checkpoint writer (270). Accordingly, an operator (220) can resume processing of data items (232) even if other operators (220) have not finished processing the checkpoint marker (250), and even if the checkpoint writer (270) has not yet written the checkpoint information (260) to the checkpoint store (280). Thus, the operators (220) can process a checkpoint marker (250) in parallel, or asynchronously, with each other, and in parallel, or asynchronously, with the writing of the checkpoint information (260) by the checkpoint writer (270).

When the sink (240) receives the checkpoint marker (250), the sink (240) can send a notification (285), notifying the checkpoint writer that the checkpoint is complete. The checkpoint writer (270) can store this completion notification (285) in the checkpoint store (280), as the last piece of data to indicate that the checkpoint is complete. However, in some instances the sink (240) may send the completion notification (285) before all the checkpoint information (260) has been sent by the operators (220). Accordingly, the checkpoint for the overall data flow system (210) can be considered incomplete until all operators (including the regular operators (220) and the sink (240)) have declared completion.

Some different aspects of implementing checkpointing of operator state are discussed below. These aspects include partitioning a checkpoint log for queries being checkpointed, checkpoints for operators with multiple data item input queues, and checkpoint information including data items and/or operator structures.

1. Log Partitioning for Queries

In one implementation, the data flow system (210) may be running multiple queries, such as multiple continuous queries at the same time. The state for each of these different queries could be checkpointed separately at different times. For example, each query may be checkpointed according to different periodic rhythms (one may be checkpointed every ten minutes, another may be checkpointed every hour, etc.). A checkpoint for a query can be initiated by inputting a checkpoint marker (250) into the data flow system (210) similarly to inputting data for that query to the data flow system (210). Accordingly, queries can be checkpointed at arbitrary and potentially overlapping times relative to each other.

As noted above, the checkpoint store (280) can include a log of the checkpoint information (260). One log can be used to store checkpoint information (260) for multiple queries. When checkpoint information (260) for multiple queries is received at the checkpoint writer (270) during overlapping times, the checkpoint information (260) for the different queries can be interleaved in the log. Thus, a range of the log may include checkpoints for the queries running in the data flow system (210), but those checkpoints may start and end at different places, so that the checkpoint information (260) for the different queries is interleaved and overlapping.

In addition to the log, the checkpoint store may include metadata for a manager of the data flow system (210). This manager metadata can indicate positions in the log where the latest checkpoint for each query running in the data flow system (210) can be found.

The log itself can be partitioned into sections. A log section may begin where a first query checkpoint begins, and may be further partitioned at each point where a checkpoint is completed. Consider an example where checkpoints for two queries, Q1 and Q2, are overlapping. The checkpoint of Q1 may start before the checkpoint of Q2, and the checkpoint of Q1 may end after the checkpoint of Q2. The log unit for Q1 may begin where Q1 starts and may end where Q1 ends (as indicated by a stored completion notification (285) for Q1), while the log unit for Q2 may begin where Q1 starts (because there is no partition where Q2 starts) and may end where Q2 ends (as indicated by a stored completion notification (285) for Q2). The manager metadata can indicate where in the log the checkpoint for Q1 starts, where the checkpoint for Q2 ends, and where the checkpoint for Q1 ends. For example, if Q1 starts at location 1, Q2 ends at location 2, and Q1 ends at location 3, each of these locations can be indicated by the manager metadata. Accordingly, the manager metadata may indicate that the latest checkpoint for Q1 can be found between location 1 and location 3. The manager metadata may also indicate that the latest checkpoint for Q2 can be found between location 1 and location 2. Alternatively, the log could be partitioned in some other manner corresponding to the queries, such as at the beginning and end of the checkpoint for each query.

Each of the log entries can include a header indicating information such as which query the log entry corresponds to, and which operator (220) the checkpoint information (260) in the entry comes from. Accordingly, the partitioning of the log file can allow the identification of log areas for checkpoints of different queries. This can allow checkpoint information (260) for a single query to be recovered without also recovering checkpoint information (260) for other queries. However, the checkpoint writer (270) can still write the checkpoint information (260) to the log in a sequential manner, such as a first-in-first-out manner.

2. Checkpoints for Operators with Multiple Data Item Input Queues

As noted above, operators (220) can include multiple input queues, which can each receive different data items to be operated on. When such an operator (220) receives a checkpoint marker (250) at one input queue, the operator (220) can stop processing data items received at that input queue. However, the operator (220) can keep track of additional data items (232) that are received, such as by keeping those data items (232) in a buffer. The operator (220) can do this with each input queue where a checkpoint marker (250) is received until each of the data item input queues have received a checkpoint marker (250). The operator (220) can then checkpoint its state, including the contents of the data items (232) in the buffer(s). The operator (220) can treat those data items in each buffer as though the buffer were an extension of the corresponding input queue. The operator (220) can wait to process the data items (232) in the buffers until after the checkpoint markers (250) have been processed, and data item processing has proceeded in the operator (220).

If the checkpoint information (260) is used to rehydrate such an operator (220) (discussed more below), the data items (232) from the buffer(s) can become the head of the input queue, and data item processing can continue.

Note that in some situations, different procedures may be used. For example, in some situations (such as where it does not matter which input queue has a data item processed next) processing of data items may proceed until all data item input queues have received a checkpoint marker (250).

3. Checkpoint Information Including Data Items and/or Operator Structures

For some operators (220), the checkpoint information (260) may include representations of data structures maintained by the operator (220). In other situations, the checkpoint information (260) can alternatively be saved as representations of a set of data items (232) for processing in the operator (220). For example, if an operator (220) compares data items (232), the checkpoint information (260) may include representations of a set of data items (232) being compared in the operator (220). As yet another alternative, the checkpoint information (260) may include one or more representations of data items (232) and one or more representations of data structures maintained by the operator (220). When rehydrating (see more detailed discussion of rehydrating below), if the checkpoint information (260) includes representations of data structures, those data structures can be restored to their indicated status to bring the operator (220) to its checkpointed state before the operator begins data item processing. If the checkpoint information (260) includes one or more data items (232), those data items can be processed by the operator (220) to bring the operator (220) to its checkpointed state before processing other data items (232).

C. Rehydration from Checkpoints

Referring still to FIG. 2, rehydration from checkpoints will be discussed. This may be done after failure of the data flow system (210), or even after the data flow system (210) has been purposely shut down. Each operator can have at least one data item input queue (222), and at least one rehydration input queue (290). The rehydration input queue (290) can be used to rehydrate the state of the operator (220). The data item input queue (222) can be the regular queue used for data processing (e.g., processing of data items (232) and checkpoint markers (250)), as discussed above.

A checkpoint reader (295) can read the last complete checkpoint from the checkpoint store (280), such as by using the headers and partitions in a log file, as discussed above. The checkpoint reader (295) can send the appropriate checkpoint information (260) to each of the operators (220). Each operator (220) can respond by prioritizing its input queues (222 and 290). The operator can forego processing data from the data item input queue (222) until the operator (220) has processed all the data in the rehydration input queue (290). This prioritization can lead to the state of the operator (220) being reestablished (rehydrated) in memory before the operator (220) resumes regular processing.

The overall data flow in the data flow system (210) may resume immediately. Each operator (220) can delay regular processing until the state of that operator (220) is rehydrated using the checkpoint information (260) form the checkpoint reader (295). Accordingly, some parts of the data flow system (210) can resume processing while other parts are still rehydrating state. This may be done without synchronization between the operators (220). Each operator (220) can be free to resume data item processing when that operator (220) has processed the data in its rehydration input queue (290).

Using this rehydration technique, the data flow system (210) can recover to the latest complete checkpoint in the checkpoint store (280). Accordingly, data loss may be limited to data that was received after the last complete checkpoint to the point where the system was shut down or failed. Even this data loss may be avoided in some situations. For example, the data flow system (210) may inform the source (230) that it may be asked to replay data (e.g., re-input data items (232) into the data flow system (210)) after the time of the latest checkpoint. The data flow system (210) may also inform the sink (240) that the sink (240) may need to handle data after the checkpoint being replayed. With such data replay, even loss of data received after the time of the latest checkpoint may be avoided.

III. Operator State Checkpoint Techniques

Several operator state checkpoint techniques will now be discussed. Each of these techniques can be performed in a computing environment. For example, each technique may be performed in a computer system that includes at least one processor and at least one memory including instructions stored thereon that when executed by the at least one processor cause the at least one processor to perform the technique (one or more memories store instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 3:
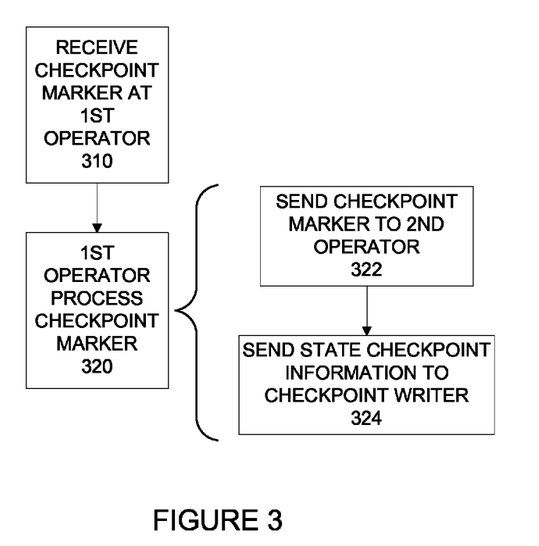
FIG. 3 is a flowchart of an operator state checkpoint technique.

Referring to FIG. 3, an operator state checkpoint technique will be described. The technique can include receiving (310) a checkpoint marker at a first operator. In response to receiving (310) the checkpoint marker, the first operator can process (320) the checkpoint marker. The processing (320) can include sending (322) the checkpoint marker to a second operator, requesting that the second operator send state checkpoint information to the checkpoint writer. Additionally, the first operator can send (324) state checkpoint information from the first operator to the checkpoint writer. This state checkpoint information can represent a state of the first operator.

The checkpoint information may include one or more representations of one or more data items received by the first operator for processing, and/or one or more representations of one or more data structures maintained by the first operator.

The first operator may include multiple input queues configured to receive checkpoint markers. The technique may further include performing steps during a period of time between a time when a first checkpoint marker is received at one of the input queues and processed, and a time when checkpoint markers have been received at all the input queues and processed. These steps may include ceasing processing of data items for all the input queues. The steps may also include, for each of the input queues that have not yet received a checkpoint marker, maintaining a buffer of data items received at the input queue until a checkpoint marker is received at that input queue. The checkpoint information for the first operator may include one or more representations of one or more data items in the buffer(s).

The technique may also include the second operator processing the checkpoint marker in response to receiving the checkpoint marker from the first operator. The second operator may perform this processing by sending state checkpoint information representing a state of the second operator from the second operator to the checkpoint writer. The first and second operators may process the checkpoint marker in parallel with each other. Also, the checkpoint writer may write the checkpoint information to persistent storage. The checkpoint writer may write the checkpoint information asynchronously with input processing performed by the first operator.

The first and second operators may be in a data flow system that sends checkpoint markers between operators using communication channels that are also used for sending other data between the operators. For example, the data flow system may use the same input/output queues for the checkpoint markers as for other data that is flowing through the data flow system. The checkpoint writer may be an additional operator in such a data flow system.

The technique may further include an input component maintaining a record of inputs provided from the input component to the data flow system after initiation of the checkpoint marker. The technique may also include an output component preparing to receive repetitions of outputs from the data flow system after initiation of the checkpoint marker. The data flow system may inform the input component and/or the output component when a checkpoint has been saved, allowing the input/output components to make such preparations.

The checkpoint writer may write checkpoint information for multiple queries to a log. The checkpoint information for the multiple queries may be interleaved in the log, and the queries may be continuous running queries. The log may include one or more markers delineating different query checkpoint units in the log. For example, such markers may partition the log into query units as discussed above (e.g., where markers are inserted in the log at locations where information for a query checkpoint is complete). The interleaving of checkpoint information can also include interleaving different pieces of checkpoint information for the same query. The pieces may include multiple pieces from the same operator and for the same query. For example, it may be useful to divide an operator's state into pieces if the operator has a large amount of checkpoint information. The operator's state may already be naturally divided into pieces within the operator. In one implementation where such pieces are considered immutable, as can be the case in streaming systems, these pieces can be passed on to the checkpoint writer and reference counted. The checkpoint writer can combine pieces from potentially disparate operators into larger blocks to efficiently write the checkpoint information to the log in the checkpoint store. Accordingly, the technique of FIG. 3 may include dividing the checkpoint information representing the state of the first operator into multiple pieces and interleaving the multiple pieces in the log with checkpoint information from operators other than the first operator.

The technique of FIG. 3 may further include receiving checkpoint information from a reader unit at a checkpoint information input queue of the first operator. The checkpoint information can be used to rehydrate a previously checkpointed state of the first operator. Additionally, processing of information in a data input queue of the first operator may be suspended while using the checkpoint information to establish the state of the operator.

Figure 4:
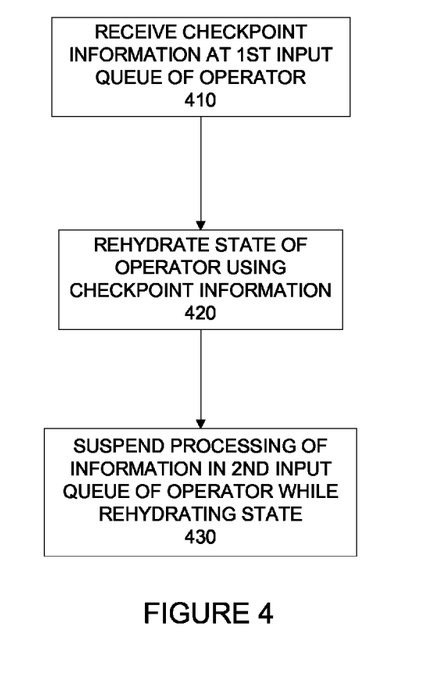
FIG. 4 is a flowchart of another operator state checkpoint technique.

Referring now to FIG. 4, another operator state checkpoint technique will be discussed. The technique can include receiving (410) checkpoint information from a reader unit at a checkpoint information input queue of an operator. A state of the operator can be rehydrated (420) using the checkpoint information. For example, this rehydration can include restoring data structures and/or processing data items represented in the checkpoint information. Processing of information in a data input queue of the operator can be suspended (430) while using the checkpoint information to rehydrate (420) the state of the operator. Rehydrating (420) the state of the operator may be performed in parallel with one or more other operators rehydrating state using checkpoint information from the reader. Rehydrating (420) may include restoring the state of the operator to a state of the operator at a time when the checkpoint information representing the state of the operator was obtained from the operator (e.g., when the operator compiled the checkpoint information and sent the checkpoint information to a checkpoint writer).

The operator may be referred to as a first operator, and the technique of FIG. 4 may further include receiving a checkpoint marker at the first operator. In response to receiving the checkpoint marker, the first operator can process the checkpoint marker. This processing may include sending the checkpoint marker on to a second operator, requesting that the second operator send state checkpoint information for the second operator to a checkpoint writer. The processing may also include sending state checkpoint information representing a state of the first operator from the first operator to the checkpoint writer. For example, the first operator may send the checkpoint marker to the second operator before sending the state checkpoint information to the checkpoint writer and/or before compiling the state checkpoint information to send to the checkpoint writer.

Figure 5:
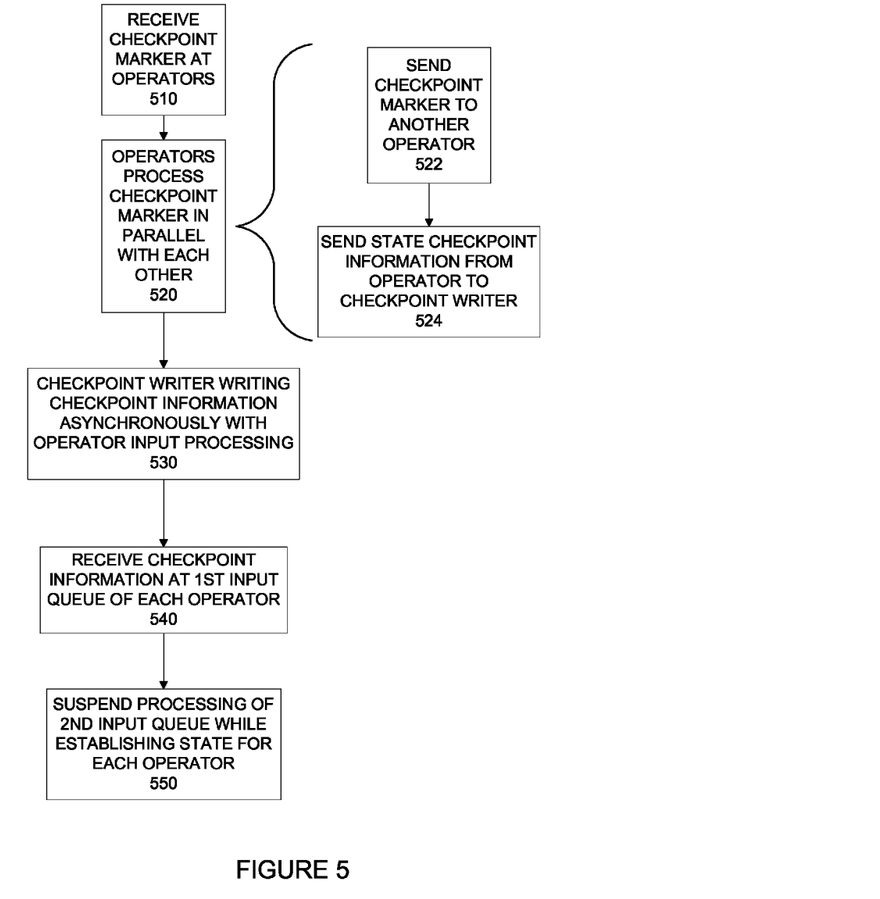
FIG. 5 is a flowchart of yet another operator state checkpoint technique.

Referring now to FIG. 5, yet another operator state checkpoint technique will be discussed. The technique can include receiving (510) a checkpoint marker at each of multiple operators in a data flow system. In response to each operator receiving (510) the checkpoint marker, the operator can process (520) the checkpoint marker in parallel with one or more other operators. This processing can include sending (522) the checkpoint marker from that operator to another operator and requesting that the other operator send state checkpoint information to a checkpoint writer. The processing can also include sending (524) state checkpoint information from that operator to the checkpoint writer. The state checkpoint information can represent a state of that operator.

The checkpoint writer can write (530) the checkpoint information representing the state of each operator. This writing (530) may be done asynchronously with input processing performed by the operators.

For each of the operators, checkpoint information can be received (540) from a reader unit at a checkpoint information input queue. Also for each of the operators, an operator state can be established while suspending (550) processing of information in a data input queue. The established operator state for each operator can be the same as when the checkpoint information was obtained from the operator. This establishing of the operator state may be done in parallel for different operators.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
   receiving a checkpoint marker at a first input queue of a first operator;
   in response to receiving the checkpoint marker at the first operator, the first operator processing the checkpoint marker by performing acts comprising:
      sending the checkpoint marker to a second operator, requesting that the second operator send state checkpoint information to a checkpoint writer; and
      sending state checkpoint information representing a state of the first operator from the first operator to the checkpoint writer; and
   performing the following during a period of time between a time when the checkpoint marker is received at the first input queue and a time when the checkpoint marker is received at a second input queue of the first operator:
      ceasing processing of data items for the second input queue; and
      maintaining a buffer of one or more data items received at the second input queue until the checkpoint marker is received at the second input queue.

2. The method of claim 1, wherein the checkpoint information comprises one or more representations of one or more data items received by the first operator for processing.

3. The method of claim 1, wherein the checkpoint information comprises one or more representations of the one or more data items in the buffer.

4. The method of claim 1, further comprising the second operator processing the checkpoint marker in response to receiving the checkpoint marker from the first operator by performing acts comprising sending state checkpoint information representing a state of the second operator from the second operator to the checkpoint writer.

5. The method of claim 1, wherein the first operator and the second operator process the checkpoint marker in parallel with each other.

6. The method of claim 1, further comprising the checkpoint writer writing the checkpoint information representing the state of the first operator to persistent storage.

7. The method of claim 1, further comprising the checkpoint writer writing the checkpoint information representing the state of the first operator, the writing being done asynchronously with input processing performed by the first operator.

8. The method of claim 1, wherein the first and second operators are in a data flow system that sends checkpoint markers between operators using communication channels that are also used for sending other data between operators.

9. The method of claim 8, wherein the checkpoint writer is an operator in the data flow system.

10. The method of claim 8, further comprising:
   an input component maintaining a record of inputs provided from the input component to the data flow system after initiation of the checkpoint marker; and
   an output component preparing to receive repetitions of outputs from the data flow system after initiation of the checkpoint marker.

11. The method of claim 1, further comprising the checkpoint writer writing checkpoint information for multiple queries to a log, the checkpoint information for the multiple queries being interleaved in the log.

12. The method of claim 11, further comprising dividing the checkpoint information representing the state of the first operator into multiple pieces and interleaving the multiple pieces in the log with checkpoint information from operators other than the first operator.

13. The method of claim 11, wherein the log includes one or more markers delineating different query checkpoint units in the log.

14. The method of claim 1, further comprising:
   receiving the checkpoint information from a reader unit at a checkpoint information input queue of the first operator;
   using the checkpoint information to rehydrate a previously checkpointed state of the first operator; and
   suspending processing of information in a data input queue of the first operator while using the checkpoint information to establish the state of the first operator.

15. A computer system comprising:
   at least one processor; and
   at least one memory comprising instructions stored thereon that when executed by the at least one processor cause the at least one processor to perform acts comprising:
      receiving checkpoint information from a reader unit at a checkpoint information input queue of an operator;
      rehydrating a state of the operator using the checkpoint information; and
      suspending processing of information in a data input queue of the operator while using the checkpoint information to rehydrate the state of the operator.

16. The computer system of claim 15, wherein rehydrating the state of the operator is performed in parallel with one or more other operators rehydrating state using checkpoint information from the reader.

17. A computer system comprising:
at least one processor; and
at least one memory comprising instructions stored thereon that when executed by the at least one processor cause the at least one processor to perform acts comprising:
receiving a checkpoint marker at a first operator in a data flow system that sends checkpoint markers between operators;
in response to receiving the checkpoint marker at the first operator, the first operator processing the checkpoint marker by performing acts comprising:
sending the checkpoint marker to a second operator, requesting that the second operator send state checkpoint information to a checkpoint writer; and
sending state checkpoint information representing a state of the first operator from the first operator to the checkpoint writer;
an input component maintaining a record of inputs provided from the input component to the data flow system after initiation of the checkpoint marker; and
an output component preparing to receive repetitions of outputs from the data flow system after initiation of the checkpoint marker.

18. The computer system of claim 17, wherein the data flow system sends checkpoint markers between operators using communication channels that are also used for sending other data between operators.

19. The computer system of claim 17, wherein the acts further comprise:
receiving the checkpoint information from a reader unit at a checkpoint information input queue of the first operator;
using the checkpoint information to rehydrate a previously checkpointed state of the first operator; and
suspending processing of information in a data input queue of the first operator while using the checkpoint information to establish the state of the first operator.

20. One or more computer-readable storage media having computer-executable instructions embodied thereon that, when executed by at least one processor, cause the at least one processor to perform acts comprising:
receiving a checkpoint marker at a first operator;
in response to receiving the checkpoint marker at the first operator, the first operator processing the checkpoint marker by performing acts comprising:
sending the checkpoint marker to a second operator, requesting that the second operator send state checkpoint information to a checkpoint writer; and
sending state checkpoint information representing a state of the first operator from the first operator to the checkpoint writer; and
dividing the checkpoint information representing the state of the first operator into multiple pieces and interleaving the multiple pieces in a log with checkpoint information from operators other than the first operator.

21. The one or more computer-readable storage media of claim 20, further comprising the checkpoint writer writing checkpoint information for multiple queries to the log, the checkpoint information for the multiple queries being interleaved in the log.

22. The one or more computer-readable storage media of claim 21, wherein the log includes one or more markers delineating different query checkpoint units in the log.

23. A computer-implemented method, comprising:
receiving a checkpoint marker at a first operator; and
in response to receiving the checkpoint marker at the first operator, the first operator processing the checkpoint marker by performing acts comprising:
sending the checkpoint marker to a second operator, requesting that the second operator send state checkpoint information to a checkpoint writer; and
sending state checkpoint information representing a state of the first operator from the first operator to the checkpoint writer;
receiving the checkpoint information from a reader unit at a checkpoint information input queue of the first operator;
using the checkpoint information to rehydrate a previously checkpointed state of the first operator; and
suspending processing of information in a data input queue of the first operator while using the checkpoint information to establish the state of the first operator.

24. The method of claim 23, wherein the first and second operators are in a data flow system that sends checkpoint markers between operators using communication channels that are also used for sending other data between operators, and wherein the method further comprises:
an input component maintaining a record of inputs provided from the input component to the data flow system after initiation of the checkpoint marker; and
an output component preparing to receive repetitions of outputs from the data flow system after initiation of the checkpoint marker.

25. The method of claim 23, further comprising the checkpoint writer writing checkpoint information for multiple queries to a log, the checkpoint information for the multiple queries being interleaved in the log.

26. The method of claim 25, further comprising dividing the checkpoint information representing the state of the first operator into multiple pieces and interleaving the multiple pieces in the log with checkpoint information from operators other than the first operator.

27. The method of claim 25, wherein the log includes one or more markers delineating different query checkpoint units in the log.

28. The method of claim 23, wherein using the checkpoint information to rehydrate a previously checkpointed state of the first operator is performed in parallel with one or more other operators rehydrating state using checkpoint information from the reader.

* * * * *